United States Patent
Li et al.

(10) Patent No.: US 9,924,016 B2
(45) Date of Patent: Mar. 20, 2018

(54) CONTENT DOWNLOAD METHOD, RELATED DEVICE, AND SYSTEM

(71) Applicant: Huawei Technologies Co., Ltd., Shenzhen, Guangdong (CN)

(72) Inventors: Yan Li, Beijing (CN); Wenfu Wu, Shanghai (CN); Kai Wei, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 285 days.

(21) Appl. No.: 14/657,012

(22) Filed: Mar. 13, 2015

(65) Prior Publication Data
US 2015/0189065 A1     Jul. 2, 2015

Related U.S. Application Data

(63) Continuation of application No. PCT/CN2012/081319, filed on Sep. 13, 2012.

(51) Int. Cl.
| | |
|---|---|
| *H04M 1/72* | (2006.01) |
| *H04W 28/02* | (2009.01) |
| *H04M 1/725* | (2006.01) |
| *H04L 29/08* | (2006.01) |

(52) U.S. Cl.
CPC ........ *H04M 1/72525* (2013.01); *H04L 67/06* (2013.01); *H04W 28/0231* (2013.01); *H04W 28/0284* (2013.01)

(58) Field of Classification Search
CPC ......... H04M 1/72525; H04W 28/0231; H04W 28/0284; H04W 4/02; H04L 67/06; H04N 21/60; H04N 21/647; H04H 20/79
USPC .............................................. 455/3.06, 414.3
See application file for complete search history.

(56) References Cited

U.S. PATENT DOCUMENTS

| | | | |
|---|---|---|---|
| 6,182,122 | B1 | 1/2001 | Berstis |
| 2002/0068579 | A1 | 6/2002 | Ishikawa et al. |
| 2011/0185041 | A1* | 7/2011 | Hunt .................. H04L 65/1069 709/219 |
| 2011/0199905 | A1 | 8/2011 | Pinheiro et al. |
| 2011/0277001 | A1 | 11/2011 | Kaluskar et al. |
| 2012/0124162 | A1* | 5/2012 | Cassidy ............ G06F 17/30029 709/217 |
| 2012/0260299 | A1* | 10/2012 | Kotecha ............. H04N 21/2402 725/118 |

(Continued)

FOREIGN PATENT DOCUMENTS

| | | |
|---|---|---|
| CN | 1194413 A | 9/1998 |
| CN | 1364038 A | 8/2002 |

(Continued)

*Primary Examiner* — Sharad Rampuria

(57) ABSTRACT

A content download method, a related device, and a system are provided. The content download method includes: receiving a download request message for content sent by a user equipment; querying a state value corresponding to a user equipment, where the state value corresponding to the user equipment includes a load value of a cell in which the user equipment is located currently and/or a current traffic charging value of the user equipment; and if the state value corresponding to the user equipment is less than a preset threshold, notifying the user equipment to directly download the content from a content providing server.

9 Claims, 10 Drawing Sheets

(56) References Cited

U.S. PATENT DOCUMENTS

| | | | | |
|---|---|---|---|---|
| 2013/0081072 A1* | 3/2013 | Alward | ............... | H04L 12/189 |
| | | | | 725/14 |
| 2014/0351952 A1* | 11/2014 | Gopu | ..................... | H04L 63/10 |
| | | | | 726/27 |
| 2015/0296051 A1* | 10/2015 | Yip | ......................... | G06F 8/61 |
| | | | | 715/740 |
| 2017/0054778 A1* | 2/2017 | Tornielli | ............... | G06Q 10/10 |
| 2017/0289750 A1* | 10/2017 | Haapanen | ............. | H04W 4/02 |

FOREIGN PATENT DOCUMENTS

| | | | |
|---|---|---|---|
| CN | 101562479 A | 10/2009 |
| CN | 101951404 A | 1/2011 |
| CN | 101977228 A | 2/2011 |
| CN | 102298599 A | 12/2011 |
| EP | 0 868 063 A2 | 9/1998 |
| JP | 2003-60646 A | 2/2003 |
| JP | 2006-350619 A | 12/2006 |
| JP | 2008-199402 A | 8/2008 |
| WO | WO 2008/147315 A1 | 12/2008 |

\* cited by examiner

CONTENT DOWNLOAD METHOD, RELATED DEVICE, AND SYSTEM

CROSS-REFERENCE TO RELATED APPLICATIONS

This application is a continuation of International Application No. PCT/CN2012/081319 filed on Sep. 13, 2012, which is hereby incorporated by reference in its entirety.

TECHNICAL FIELD

The present application relates to the mobile network field, and in particular, to a content download method, a related device, and a system.

BACKGROUND

In a mobile network, increasing functions of a user equipment (User Equipment, UE) empower the UE to perform more services, for example, web browsing, video viewing, online gaming, and content download. Content download is one of services that are most frequently performed by a UE in a mobile network. A UE performs content download mainly in twos, where a first is: the UE directly sends a content download request to a content providing server, and the content providing server downloads content to the UE; and a second is: the UE firstly notifies an offline download server of location information of content that needs to be downloaded, the offline download server acts as a proxy of the UE to buffer content of a content providing server to the offline download server, and then the UE may download, by using a stationary network device (for example, a personal computer), the content buffered by the offline download server to the stationary network device, and download the content to the UE by using a synchronization technology between the stationary network device and the UE.

Bandwidth of a mobile network is generally shared by multiple users. When multiple users of a cell perform high-bandwidth services at the same time, a network resource congestion may occur in the cell; and at this time, if the UE performs content download by using the first, congestion may be intensified, thereby reducing a network resource utilization rate. In addition, a mobile network is generally charged at a flat monthly fee for limited traffic, and excess traffic is charged at a relatively high tariff; however, a user is not sensitive to traffic consumed in the current month or whether the user is roaming or not. If a user has exceeded or approached a traffic limit of the current month or the user is in a roaming charging state, performing content download by using the first may result in an extra payment. In the second, it is considered by default that a mobile network is not suitable for content download. A mobile network is only used to transmit download signaling, whereas download is performed in a fixed-line network. The second has a strong impact on user experience, for example, when a user downloads a mobile phone eBook by using a mobile phone during an outdoor activity, the user cannot view the eBook immediately, but needs to view the eBook by synchronizing the eBook to the mobile phone by using a personal computer after coming back home, thereby compromising the user experience.

SUMMARY

The present application provides a content download method, a related device, and a system, which are used to improve a network resource utilization rate, reduce an extra payment by a user, and improve user experience.

A first aspect of the present application provides a content download method, including:

receiving a download request message for content sent by a user equipment;

querying a state value corresponding to the user equipment, where the state value corresponding to the user equipment includes a load value of a cell in which the user equipment is located currently or a current traffic charging value of the user equipment; and if the state value corresponding to the user equipment is less than a preset threshold, notifying the user equipment to directly download the content from a content providing server.

In a first implementation, if the state value of the user equipment is greater than or equal to the preset threshold, notifying an offline download server to download the content from the content providing server and buffer the content.

With reference to the first implementation of the first aspect, in a second implementation, notifying the offline download server to push the buffered content to the user equipment, or notifying the user equipment to download the content from the offline download server.

With reference to the second implementation of the first aspect, in a third implementation, before the notifying the offline download server to push the buffered content to the user equipment, or notifying the user equipment to download the content from the offline download server, determining whether the state value corresponding to the user equipment is less than the preset threshold; and if the state value corresponding to the user equipment is less than the preset threshold, executing the step of notifying the offline download server to push the buffered content to the user equipment, or notifying the user equipment to download the content from the offline download server.

With reference to the first, second, or third implementation of the first aspect, in a fourth implementation, notifying the offline download server to push the buffered content to an associated device bound to the user equipment, or notifying an associated device bound to the user equipment to download the content from the offline download server.

With reference to the first, second, third, or fourth implementation of the first aspect, in a fifth implementation, notifying a packet data network gateway to perform discounted charging on traffic of the content that is downloaded by the offline download server from the content providing server.

With reference to the first aspect or any one of the first to fifth implementations of the first aspect, in a sixth implementation, if the state value corresponding to the user equipment includes the load value of the cell in which the user equipment is located currently, the querying a state value corresponding to the user equipment includes:

querying the state value corresponding to the user equipment from the packet data network gateway or a base station of the cell in which the user equipment is located currently.

With reference to the first aspect or any one of the first to fifth implementations of the first aspect, in a seventh implementation, if the state value corresponding to the user equipment includes the current traffic charging value of the user equipment, the querying a state value corresponding to the user equipment includes:

querying the state value corresponding to the user equipment from an online charging system or an offline charging system.

A second aspect of the present application provides a content download method, including:

sending, by a user equipment, a download request message for content to a download control network element, so that the download control network element is triggered to query a state value corresponding to the user equipment, and when the state value corresponding to the user equipment is less than a preset threshold, the download control network element notifies the user equipment to download the content from a content providing server, where the state value corresponding to the user equipment includes a load value of a cell in which the user equipment is located currently or a current traffic charging value of the user equipment; and responding to, by the user equipment, the notification of the download control network element, and directly downloading the content from the content providing server.

In a first implementation, receiving, by the user equipment, the content pushed by an offline download server, or responding to, by the user equipment, a notification of the download control network element, and downloading the content from an offline download server; where, when the state value of the user equipment is greater than or equal to the preset threshold, the download control network element notifies the offline download server to download the content from the content providing server and buffer the content, and notifies the offline download server to push the buffered content to the user equipment, or notifies the user equipment to download the content from the offline download server.

A third aspect of the present application provides a content download method, including:

responding to, by an offline download server, a first notification of a download control network element, and downloading content from a content providing server and buffering the content; and responding to, by the offline download server, a second notification of the download control network element, and pushing the buffered content to a user equipment; where the first notification is sent by the download control network element when the download control network element queries, after receiving a download request message for the content sent by the user equipment, a state value corresponding to the user equipment, and the state value corresponding to the user equipment is less than a preset threshold; and the state value corresponding to the user equipment includes a load value of a cell in which the user equipment is located currently or a current traffic charging value of the user equipment.

In a first implementation, responding to, by the offline download server, a third notification of the download control network element, and pushing the buffered content to an associated device bound to the user equipment; or responding to, by the offline download server, a third notification of the download control network element, and notifying an associated device bound to the user equipment to download the content from the offline download server.

A fourth aspect of the present application provides a download control network element, including:

a receiving unit, configured to receive a download request message for content sent by a user equipment;

a querying unit, configured to query a state value corresponding to the user equipment, where the state value corresponding to the user equipment includes a load value of a cell in which the user equipment is located currently or a current traffic charging value of the user equipment;

a determining unit, configured to determine whether the state value corresponding to the user equipment is less than a preset threshold; and a notifying unit, configured to, when the determining unit determines that the state value corresponding to the user equipment is less than the preset threshold, notify the user equipment to download the content from a content providing server.

In a first implementation, the notifying unit is further configured to: when the determining unit determines that the state value of the user equipment is greater than or equal to the preset threshold, notify an offline download server to download the content from the content providing server and buffer the content.

With reference to the first implementation of the fourth aspect, in a second implementation, the notifying unit is further configured to notify the offline download server to push the buffered content to the user equipment, or configured to notify the user equipment to download the content from the offline download server.

With reference to the second implementation of the fourth aspect, in a third implementation, the notifying unit is further configured to: when the determining unit determines that the state value corresponding to the user equipment is less than the preset threshold, notify the offline download server to push the buffered content to the user equipment, or notify the user equipment to download the content from the offline download server.

With reference to the first, second, or third implementation of the fourth aspect, in a fourth implementation, the notifying unit is further configured to notify the offline download server to push the buffered content to an associated device bound to the user equipment, or configured to notify an associated device bound to the user equipment to download the content from the offline download server.

With reference to the first, second, third, or fourth implementation of the fourth aspect, in a fifth implementation, the notifying unit is further configured to notify a packet data network gateway to perform discounted charging on traffic of the content that is downloaded by the offline download server from the content providing server.

With reference to the fourth aspect or any one of the first to fifth implementations of the fourth aspect, in a sixth implementation, if the state value corresponding to the user equipment includes the load value of the cell in which the user equipment is located currently, the querying unit is specifically configured to query the state value corresponding to the user equipment from the packet data network gateway or a base station of the cell in which the user equipment is located currently.

With reference to the fourth aspect or any one of the first to fifth implementations of the fourth aspect, in a seventh implementation, if the state value corresponding to the user equipment includes the current traffic charging value of the user equipment, the querying unit is specifically configured to query the state value corresponding to the user equipment from an online charging system or an offline charging system.

A fifth aspect of the present application provides a computer storage medium, where the computer storage medium stores a program, and when the program is executed, all or a part of steps of the content download method according to the first aspect of the present application are included.

A sixth aspect of the present application provides a download control network element, including: an input apparatus, an output apparatus, and a processor; where the processor executes the following steps:

receiving a download request message for content sent by a user equipment;

querying a state value corresponding to the user equipment, where the state value corresponding to the user equipment includes a load value of a cell in which the user equipment is located currently or a current traffic charging value of the user equipment; and if the state value corresponding to the user equipment is less than a preset threshold, notifying the user equipment to download the content from a content providing server.

In a first implementation, the processor further executes the following step:

if the state value of the user equipment is greater than or equal to the preset threshold, notifying an offline download server to download the content from the content providing server and buffer the content.

With reference to the first implementation of the sixth aspect, in a second implementation, the processor further executes the following step:

notifying the offline download server to push the buffered content to the user equipment, or notifying the user equipment to download the content from the offline download server.

With reference to the second implementation of the sixth aspect, in a third implementation, the processor further executes the following steps:

before the notifying the offline download server to push the buffered content to the user equipment, or notifying the user equipment to download the content from the offline download server, determining whether the state value corresponding to the user equipment is less than the preset threshold; and if the state value corresponding to the user equipment is less than the preset threshold, executing the step of notifying the offline download server to push the buffered content to the user equipment, or notifying the user equipment to download the content from the offline download server.

With reference to the first, second, or third implementation of the sixth aspect, in a fourth implementation, the processor further executes the following step:

notifying the offline download server to push the buffered content to an associated device bound to the user equipment, or notifying an associated device bound to the user equipment to download the content from the offline download server.

With reference to the first, second, third, or fourth implementation of the sixth aspect, in a fifth implementation, the processor further executes the following step:

notifying a packet data network gateway to perform discounted charging on traffic of the content that is downloaded by the offline download server from the content providing server.

With reference to the sixth aspect or any one of the first to fifth implementations of the sixth aspect, in a sixth implementation, if the state value corresponding to the user equipment includes the load value of the cell in which the user equipment is located currently, when the processor queries the state value corresponding to the user equipment, the following step is executed:

querying the state value corresponding to the user equipment from the packet data network gateway or a base station of the cell in which the user equipment is located currently.

With reference to the sixth aspect or any one of the first to fifth implementations of the sixth aspect, in a seventh implementation, if the state value corresponding to the user equipment includes the current traffic charging value of the user equipment, when the processor queries the state value corresponding to the user equipment, the following step is executed:

querying the state value corresponding to the user equipment from an online charging system or an offline charging system.

A seventh aspect of the present application provides a user equipment, including:

a sending unit, configured to send a download request message for content to a download control network element, so that the download control network element is triggered to query a state value corresponding to the user equipment, and when the state value corresponding to the user equipment is less than a preset threshold, the download control network element notifies the user equipment to download the content from a content providing server, where the state value corresponding to the user equipment includes a load value of a cell in which the user equipment is located currently or a current traffic charging value of the user equipment; and a download unit, configured to respond to the notification of the download control network element, and download the content from the content providing server.

In a first implementation, the download unit is further configured to receive the content pushed by an offline download server, or configured to respond to a notification of the download control network element, and download the content from an offline download server; where, when the state value of the user equipment is greater than or equal to the preset threshold, the download control network element notifies the offline download server to download the content from the content providing server and buffer the content, and notifies the offline download server to push the buffered content to the user equipment, or notifies the user equipment to download the content from the offline download server.

An eighth aspect of the present application provides a computer storage medium, where the computer storage medium stores a program, and when the program is executed, all or a part of steps of the content download method according to the second aspect of the present application are included.

A ninth aspect of the present application provides a user equipment, including: an input apparatus, an output apparatus, and a processor, where the processor executes the following steps:

sending a download request message for content to a download control network element, so that the download control network element is triggered to query a state value corresponding to the user equipment, and when the state value corresponding to the user equipment is less than a preset threshold, the download control network element notifies the user equipment to download the content from a content providing server, where the state value corresponding to the user equipment includes a load value of a cell in which the user equipment is located currently or a current traffic charging value of the user equipment; and responding to the notification of the download control network element, and downloading the content from the content providing server.

In a first implementation, the processor further executes the following step:

receiving the content pushed by an offline download server; or responding to a notification of the download control network element, and downloading the content from an offline download server; where when the state value of the user equipment is greater than or equal to the preset threshold, the download control network element notifies the offline download server to download the content from the content providing server and buffer the content, and notifies the offline download server to push the buffered content to the user equipment, or notifies the user equipment to download the content from the offline download server.

A tenth aspect of the present application provides an offline download server, including:

a first responding unit, configured to respond to a first notification of a download control network element, and download content from a content providing server and buffer the content; and a second responding unit, configured to respond to a second notification of the download control network element, and push the content buffered by the first responding unit to a user equipment; where the first notification is sent by the download control network element when the download control network element queries, after receiving a download request message for the content sent by the user equipment, a state value corresponding to the user equipment, and the state value corresponding to the user equipment is less than a preset threshold; and the state value corresponding to the user equipment includes a load value of a cell in which the user equipment is located currently or a current traffic charging value of the user equipment.

In a first implementation, the second responding unit is further configured to respond to a third notification of the download control network element, and push the content buffered by the first responding unit to an associated device bound to the user equipment; or, the second responding unit is further configured to respond to a third notification of the download control network element, and notify an associated device bound to the user equipment to download the content from the offline download server.

An eleventh aspect of the present application provides a computer storage medium, where the computer storage medium stores a program, and when the program is executed, all or a part of steps of the content download method according to the third aspect of the present application are included.

A twelfth aspect of the present application provides an offline download server, including: an input apparatus, an output apparatus, and a processor; where the processor executes the following steps:

responding to a first notification of a download control network element, and downloading content from a content providing server and buffering the content; and responding to a second notification of the download control network element, and pushing the buffered content to a user equipment; where the first notification is sent by the download control network element network element when the download control network element queries, after receiving a download request message for the content sent by the user equipment, a state value corresponding to the user equipment, and the state value corresponding to the user equipment is less than a preset threshold; and the state value corresponding to the user equipment includes a load value of a cell in which the user equipment is located currently or a current traffic charging value of the user equipment.

In a first implementation, the processor further executes the following step:

responding to a third notification of the download control network element, and pushing the buffered content to an associated device bound to the user equipment; or responding to a third notification of the download control network element, and notifying an associated device bound to the user equipment to download the content from the offline download server.

A thirteenth aspect of the present application provides a content download system, including at least a user equipment and a download control network element, where:

the user equipment is configured to send a download request message for content to the download control network element, respond to a notification of the download control network element, and download the content from a content providing server; and the download control network element is configured to receive the content download request message sent by the user equipment, and query a state value corresponding to the user equipment, where the state value corresponding to the user equipment includes a load value of a cell in which the user equipment is located currently or a current traffic charging value of the user equipment; and when the state value corresponding to the user equipment is less than a preset threshold, notify the user equipment to download the content from the content providing server.

In a first implementation, the system further includes an offline download server, where:

the offline download server is configured to respond to a first notification of the download control network element, and download the content from the content providing server and buffer the content; and the download control network element is further configured to, when the state value corresponding to the user equipment is greater than or equal to the preset threshold, send the first notification to the offline download server, where the first notification is used to notify the offline download server to download the content from the content providing server and buffer the content.

With reference to the first implementation of the thirteenth aspect, in a second implementation, the offline download server is further configured to respond to a second notification of the download control network element, and push the buffered content to the user equipment;

the download control network element is further configured to send the second notification to the offline download server, where the second notification is used to notify the offline download server to push the buffered content to the user equipment; and the user equipment is further configured to receive the content pushed by the offline download server.

With reference to the first or second implementation of the thirteenth aspect, in a third implementation, the offline download server is further configured to respond to a third notification of the download control network element, and push the buffered content to an associated device bound to the user equipment; or configured to respond to a third notification of the download control network element, and notify an associated device bound to the user equipment to download the content from the offline download server; and the download control network element is further configured to send the third notification to the offline download server, where the third notification is used to notify the offline download server to push the buffered content to the associated device bound to the user equipment, or configured to notify the associated device bound to the user equipment to download the content from the offline download server.

In the present application, after receiving a download request message for content sent by a UE, a download control network element firstly queries a state value corresponding to the UE, where the state value corresponding to the UE includes a load value of a cell in which the UE is located currently or a current traffic charging value of the UE; if the load value of the cell in which the UE is located currently is less than a preset threshold, it indicates that there are sufficient network resources of the cell in which the UE is located currently sufficient, and in this case, the behavior in which the UE directly downloads the content from a content providing server does not cause network resource congestion of the cell, thereby improving a network resource utilization rate; or if the current traffic charging value of the UE is less than a preset threshold, it indicates that the traffic used by the UE is still below the traffic limit specified in the flat monthly package, and in this case, the behavior in which the UE directly downloads the content from the content providing server can reduce an extra payment by the user. In addition, in the present application, the UE does not need to download the content from an offline download server by using a stationary network device (for example, a personal computer) and then synchronize the content to the UE by using a synchronization technology between the stationary network device and the UE, thereby improving user experience.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The present application provides a content download method, a related device, and a system, which can improve a network resource utilization rate, reduce an extra payment by a user, and improve user experience. Detailed descriptions are separately performed in the following.

Figure 1:
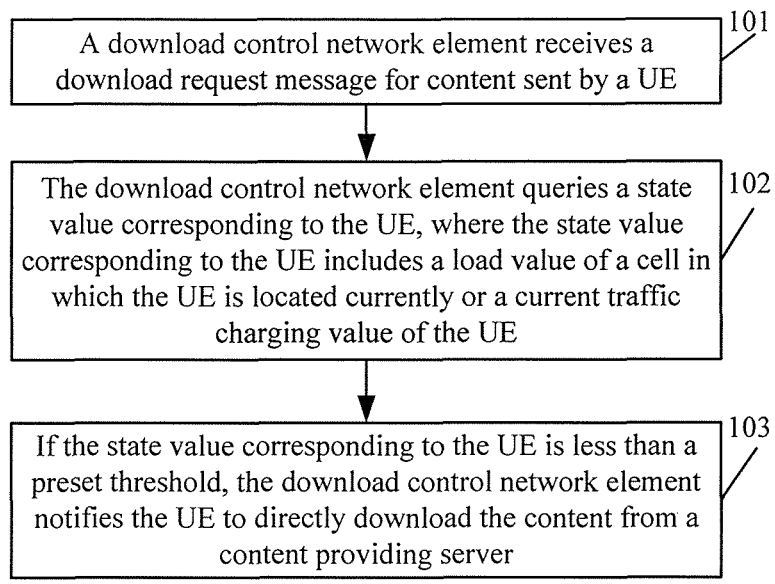
FIG. 1 is a flowchart of a content download method according to a first embodiment of the present application.

Referring to FIG. 1, FIG. 1 is a flowchart of a content download method according to a first embodiment of the present application. The content download method shown in FIG. 1 is described from a perspective of a download control network element. As shown in FIG. 1, the content download method may include the following steps.

101. A download control network element receives a download request message for content sent by a UE.

In the present application, the download control network element is a logical functional entity. The download control network element may be a physical entity independently deployed by a mobile network operator, for example, a capability enabling platform and an intelligent pushing platform deployed by an operator, or may be a physical entity integrated into a mobile network, for example, may be a physical entity integrated into a packet data network gateway (PDN Gateway, PGW), which is not limited by the present application.

102. The download control network element queries a state value corresponding to the UE, where the state value corresponding to the UE includes a load value of a cell in which the UE is located currently or a current traffic charging value of the UE.

In the present application, a load value of a cell in which a UE is located currently may be the number of users who have accessed the cell in which the UE is located currently, or may be a busy/idle degree of the cell in which the UE is located currently, which is not limited by the present application.

103. If the state value corresponding to the UE is less than a preset threshold, the download control network element notifies the UE to download the content from a content providing server.

In the present application, if the load value of the cell in which the UE is located currently is less than the preset threshold, it indicates that there are sufficient network resources of the cell in which the UE is located currently sufficient. In this case, the behavior in which the download control network element notifies the UE to download the content from the content providing server does not cause network resource congestion of the cell, thereby improving a network resource utilization rate; If the current traffic charging value of the UE is less than the preset threshold, it indicates that the traffic used by the UE is still below the traffic limit specified in the flat monthly package. In this case, the behavior in which the download control network element notifies the UE to download the content from the content providing server does not cause a high extra payment by a user. In addition, in the present application, the user does not need to download the content from an offline download server by using a stationary network device such as a personal computer, and then synchronize the content to the UE by using a synchronization technology between the stationary network device and the UE, thereby improving user experience.

As a possible implementation, in the content download method described in FIG. 1, if the state value of the UE is greater than or equal to the preset threshold, it indicates that there are insufficient network resources in the cell in which the UE is located currently, or it indicates that the traffic used by the UE exceeds the traffic limit specified in the flat monthly package. At this time, the download control network element may notify the offline download server to download the content from the content providing server and buffer the content.

Further, the download control network element may notify the offline download server to directly push the buffered content to the UE, or notify the UE to directly download the content from the offline download server, so as to avoid network resource congestion and a decreased network resource utilization rate that would otherwise occur in the cell when the UE directly downloads the content from the content providing server, or to avoid an extra payment that is caused when the UE directly downloads the content from the content providing server.

As a possible implementation, before notifying the offline download server to push the buffered content to the UE, or notifying the UE to download the content from the offline download server, the download control network element may further firstly determine whether the state value corresponding to the UE is less than the preset threshold. If the state value corresponding to the UE is less than the preset threshold, the foregoing step of notifying the offline download server to push the buffered content to the UE or notifying the UE to download the content from the offline download server is then executed. If the state value corresponding to the UE is greater than or equal to the preset threshold, the download control network element may continue to detect the state value corresponding to the UE until it is determined that the state value corresponding to the UE is less than the preset threshold, and then the foregoing step of notifying the offline download server to push the buffered content to the UE or notifying the UE to download the content from the offline download server is executed. This is done to avoid making the situation worse when network resources of the cell in which the UE is located are congested or the current traffic charging value of the UE exceeds the charging scope of a flat monthly fee for limited traffic of the user.

As a possible implementation, the download control network element may notify the offline download server to push the buffered content to an associated device bound to the UE (for example, a mobile phone and a personal computer), or notify an associated device bound to the UE to download the content from the offline download server.

As a possible implementation, the download control network element may prestore an identifier of the associated device bound to the UE, for example, a phone number, an IP address, and a Media Access Control (MAC) address of the associated device.

As a possible implementation, the download control network element may notify a packet data network gateway (PDN Gateway, PGW) to perform discounted charging on traffic of the content that is downloaded by the offline download server from the content providing server, thereby reducing an extra payment of the user.

As a possible implementation, if the state value corresponding to the UE includes the load value of the cell in which the UE is located currently, the querying, by the download control network element, a state value corresponding to the UE may specifically be:

the download control network element queries the state value corresponding to the UE from the PGW or from a base station of the cell in which the UE is located currently.

As a possible implementation, if the state value corresponding to the UE includes the current traffic charging value of the UE, the querying, by the download control network element, a state value corresponding to the UE may specifically be:

the download control network element queries the state value corresponding to the UE from an online charging system (Online Charging System, OCS) or an offline charging system (Offline Charging System, OFCS).

In the content download method described in FIG. 1, after receiving a download request message for content sent by a UE, a download control network element firstly queries a state value corresponding to the UE, where the state value corresponding to the UE includes a load value of a cell in which the UE is located currently or a current traffic charging value of the UE; if the load value of the cell in which the UE is located currently is less than a preset threshold, it indicates that there are sufficient network resources of the cell in which the UE is located currently sufficient, and in this case, the behavior in which the UE directly downloads content from a content providing server does not cause network resource congestion of the cell, thereby improving a network resource utilization rate; and if the current traffic charging value of the UE is less than a preset threshold, it indicates that the current traffic charging value of the UE is still within a user monthly quota, and in this case, the behavior in which the UE directly downloads the content from the content providing server does not cause an extra payment of the user. In addition, in the present application, the UE does not need to download the content from an offline download server by using a stationary network device (for example, a personal computer) and then synchronize the content to the UE by using a synchronization technology between the stationary network device and the UE, thereby improving user experience.

Figure 2:
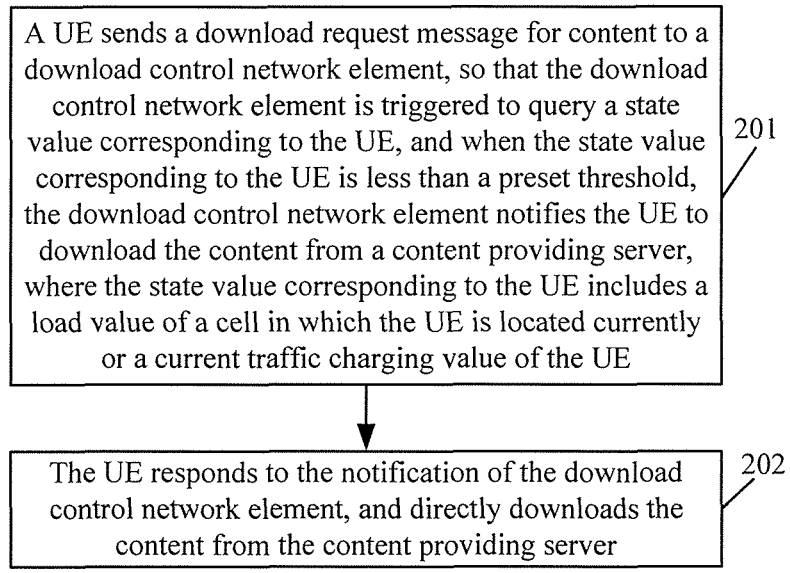
FIG. 2 is a flowchart of a content download method according to a second embodiment of the present application.

Referring to FIG. 2, FIG. 2 is a flowchart of a content download method according to a second embodiment of the present application. The content download method shown in FIG. 2 is mainly described from a perspective of a UE. As shown in FIG. 2, the content download method may include the following steps.

201. A UE sends a download request message for content to a download control network element, so that the download control network element is triggered to query a state value corresponding to the UE, and when the state value corresponding to the UE is less than a preset threshold, the download control network element notifies the UE to directly download the content from a content providing server, where the state value corresponding to the UE includes a load value of a cell in which the UE is located currently or a current traffic charging value of the UE.

202. The UE responds to the notification of the download control network element, and directly downloads the content from the content providing server.

As a possible implementation, the UE may also receive the content pushed by an offline download server; or, the UE may respond to a notification of the download control network element, and download the content from the offline download server; where, when the state value of the UE is greater than or equal to the preset threshold, the download control network element notifies the offline download server to download the content from the content providing server and buffer the content, and notifies the offline download server to push the buffered content to the UE, or notifies the UE to download the content from the offline download server.

In the content download method described in FIG. 2, if a load value of a cell in which a UE is located currently is less than a preset threshold or a current traffic charging value of the UE is less than a preset threshold, the UE may respond to a notification of a download control network element, and directly download content from a content providing server; therefore network resource congestion in the cell may not be caused, a network resource utilization rate can be improved, and an extra payment by a user can be reduced. In addition, the UE does not need to download the content by using a synchronization technology with a stationary network device, thereby improving user experience.

Figure 3:
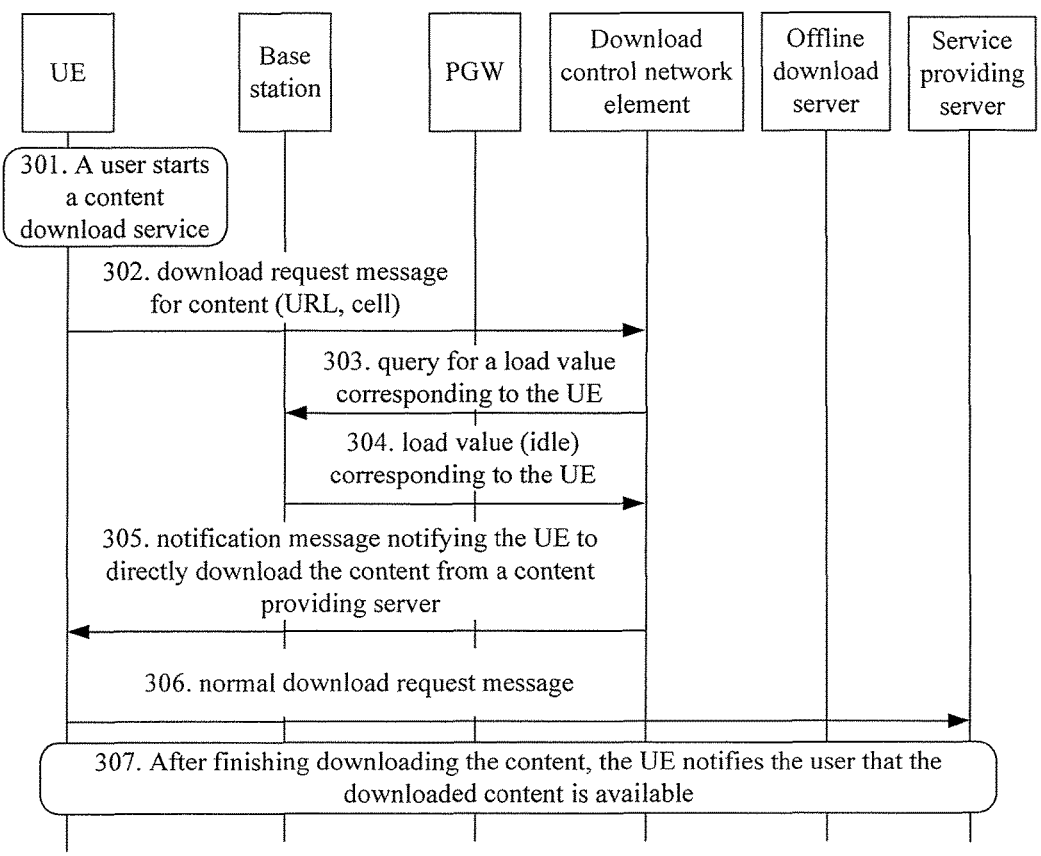
FIG. 3 is a flowchart of a content download method according to a third embodiment of the present application.

Referring to FIG. 3, FIG. 3 is a flowchart of a content download method according to a third embodiment of the present application. The content download method shown in FIG. 3 is described from perspectives of a UE and a download control network element. As shown in FIG. 3, the content download method may include the following steps.

301. A user starts a content download service on a UE.

302. The UE sends a download request message for content to a download control network element by invoking an application programming interface (Application Programming Interface, API) or sending a message, where the message may include address information (for example, a content URL) of content that the UE needs to download and information of a cell (cell) in which the UE is located currently.

It leaves to the user to control whether the UE sends a download request message for content. For example, when the user chooses to download a file, the UE may provide two options, that is, dynamic download and normal download, and the user may choose which download manner to use. For some relatively urgent downloads, the user may choose the normal download, and in this case, the UE may download content from a content providing server; and when the user chooses the dynamic download, the UE is triggered to execute step 302.

303. The download control network element queries, according to the cell information reported by the UE, a load value corresponding to the UE from a base station of the cell in which the UE is located currently.

304. The base station of the cell in which the UE is located currently returns the load value corresponding to the UE to the download control network element, where the load value corresponding to the UE may be a busy/idle degree of the cell in which the UE is located, and the download control network element determines that the busy/idle degree is less than a preset threshold, that is, the cell in which the UE is located is in an idle (idle) state.

As a possible implementation, the load value corresponding to the UE may also be a number of users who have accessed the cell in which the UE is located, and when the number of users who have accessed the cell in which the UE is located is less than the preset threshold, the following step 305 to step 306 are executed as well.

305. The download control network element returns a notification message to the UE, where the notification message is used to notify the UE to download the content from a content providing server.

306. The UE responds to the notification of the download control network element, and sends a normal download request message to the content providing server.

307. After finishing downloading the content, the UE notifies the user that the downloaded content is available.

In the content download method described in FIG. 3, a network resource utilization rate can be improved, and an extra payment by a user is reduced. In addition, the UE does not need to download content from an offline download server by using a stationary network device (for example, a personal computer) and then synchronize the content to the UE by using a synchronization technology between the stationary network device and the UE, thereby improving user experience.

Figure 4:
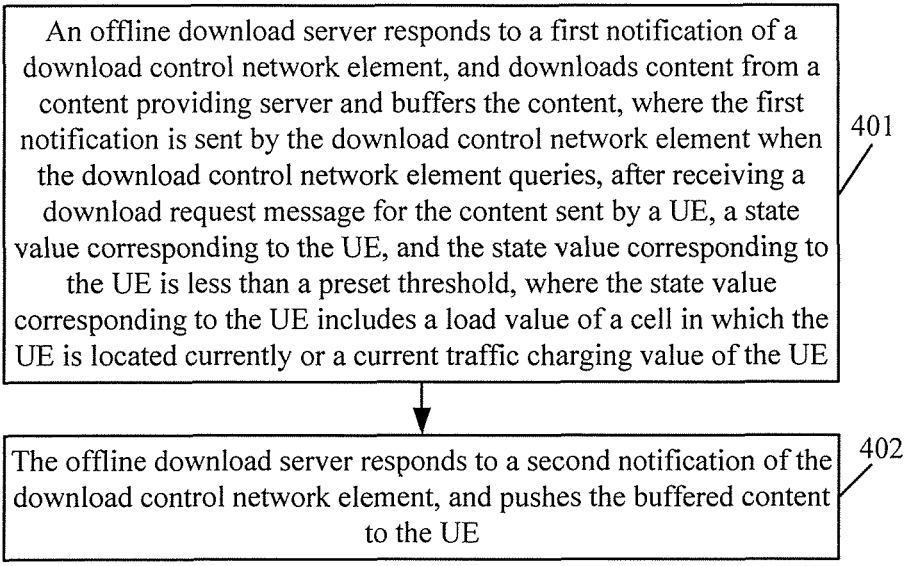
FIG. 4 is a flowchart of a content download method according to a fourth embodiment of the present application.

Referring to FIG. 4, FIG. 4 is a flowchart of a content download method according to a fourth embodiment of the present application. The content download method shown in FIG. 4 is described from a perspective of an offline download server. As shown in FIG. 4, the content download method may include the following steps.

401. An offline download server responds to a first notification of a download control network element, and downloads content from a content providing server and buffers the content. In this implementation, the first notification is sent to the offline download server by the download control network element when the download control network element queries, after receiving a download request message for the content sent by a UE, a state value corresponding to the UE, and the state value corresponding to the UE is less than a preset threshold. In this implementation, the state value corresponding to the UE includes a load value of a cell in which the UE is located currently or a current traffic charging value of the UE.

402. The offline download server responds to a second notification of the download control network element, and pushes the buffered content to a UE.

As a possible implementation, in the content download method described in FIG. 4, the offline download server may further respond to a third notification of the download control network element, and push the buffered content to an associated device bound to the UE; or the offline download server may respond to a third notification of the download control network element, and notify an associated device bound to the UE to download the content from the offline download server.

In the content download method described in FIG. 4, when a download control network element determines that a load value of a cell in which a UE is located currently is less than a preset threshold, or a current traffic charging value of the UE is less than a preset threshold, an offline download server may respond to a notification of the download control network element, download content from a content providing server and buffer the content, and push the buffered content to the UE; therefore network resource congestion of the cell may not be caused, a network resource utilization rate can be improved, and an extra payment by a user can be reduced. In addition, the UE does not need to download the content by using a synchronization technology with a stationary network device, thereby improving user experience.

Figure 5:
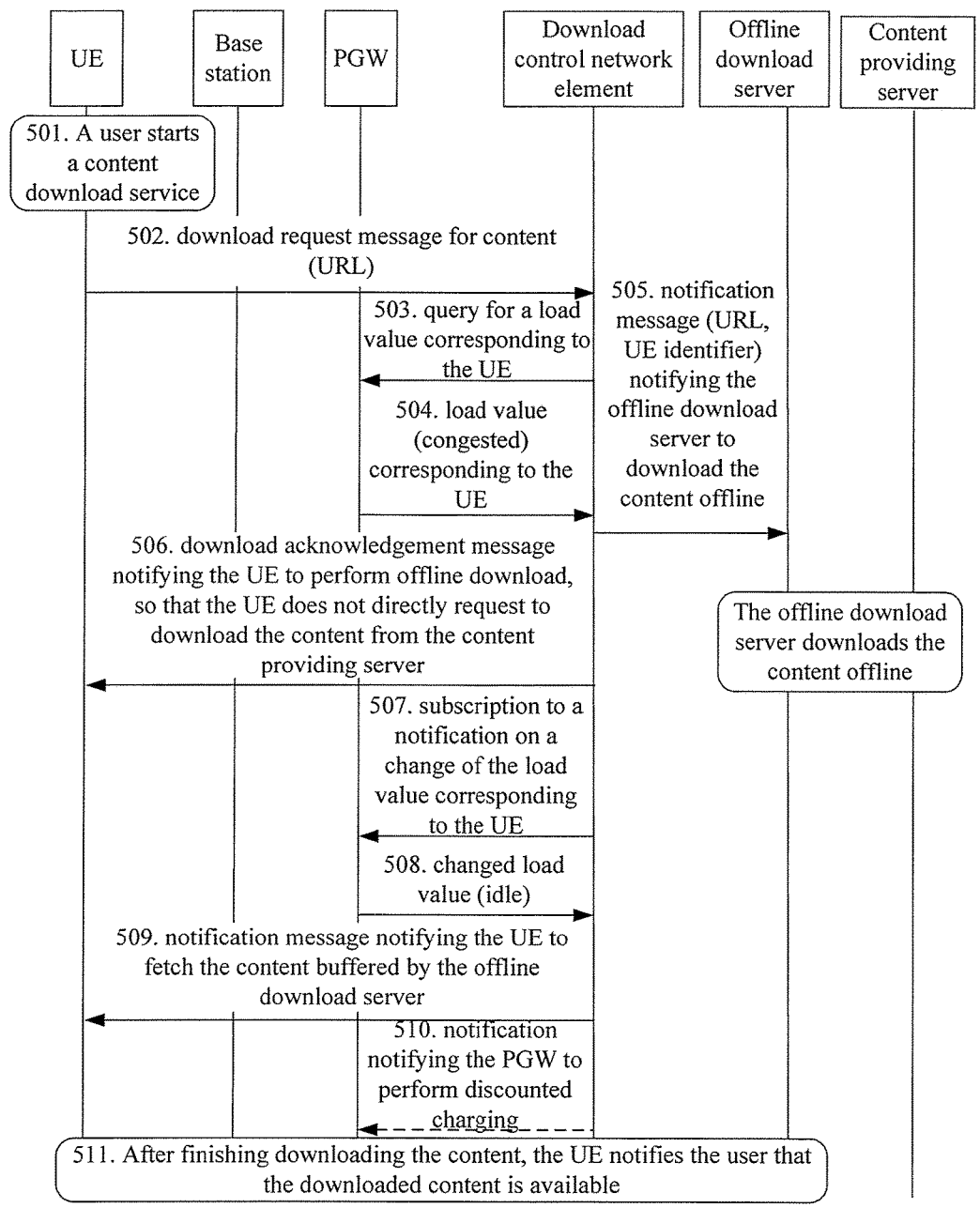
FIG. 5 is a flowchart of a content download method according to a fifth embodiment of the present application.

Referring to FIG. 5, FIG. 5 is a flowchart of a content download method according to a fifth embodiment of the present application. The content download method shown in FIG. 5 is described from perspectives of a UE, a download control network element, and an offline download server. As shown in FIG. 5, the content download method may include the following steps.

501. A user starts a content download service on a UE.

502. The UE sends a download request message for content to a download control network element by invoking an API or sending a message, where the message may include address information (for example, a content URL) of content that the UE needs to download.

503. The download control network element queries a load value corresponding to the UE from a PGW that allocates an IP address to the UE, where the load value corresponding to the UE may be a number of users who have accessed a cell in which the UE is located, and the number of users who have accessed the cell in which the UE is located is greater than a preset threshold, that is, network resources of the cell in which the UE is located are congested.

The download control network element may send a query request carrying UE identification information to the PGW that allocates an IP address to the UE, where the UE identification information may be a phone number or an IP address of the UE, and the like, so as to implement querying the load value corresponding to the UE from the PGW.

In this embodiment, because IP addresses allocated by different PGWs fall in different ranges, the download control network element may determine the PGW that allocates an IP address to the UE by analyzing a range in which the IP address of the UE falls in, and then query the load value corresponding to the UE from the PGW.

504. The PGW returns the load value corresponding to the UE to the download control network element, and further the PGW may return an access technology (for example, 2G or 3G access) of the UE to the download control network element.

505. The download control network element sends a notification message (that is, an offline download request) to an offline download server, where the notification message includes a UE identifier and an address of the content that the UE needs to download, so that the offline download server downloads the content from a content providing server in an offline download manner and buffers the content in local, and associates the content with the UE identifier.

The offline download server can be implemented in multiple manners, for example, it can be implemented by a personal network hard disk or personal cloud space, which is not limited by the present application.

506. The download control network element returns a download acknowledgement message to the UE, and signals the UE to perform offline download, so that the UE does not directly request to download content from the content providing server.

507. The download control network element may further subscribe to a notification service, to receive from the PGW a notification on a change of the load value corresponding to the UE.

508. When the load value corresponding to the UE changes, for example, the load value corresponding to the UE changes from being greater than the preset threshold to being less than the preset threshold, it indicates that network resources of the cell in which the UE is located change from congested to idle, or the UE switches to a new access technology, for example, the UE switches from 2G access to wireless local area network (Wireless Local Area Networks, WLAN) access, the PGW reports a changed load value to the download control network element; and in this embodiment, the load value corresponding to the UE changes from being greater than the preset threshold to being less than the preset threshold, that is, network resources of the cell in which the UE is located change from congested to idle.

509. If the load value corresponding to the UE is less than the preset threshold, that is, network resources of the cell in which the UE is located are idle, the download control network element sends a notification message to the UE, where the notification message is used to signal the UE to fetch the content buffered by the offline download server.

A procedure in which the UE fetches the buffered content from the offline download server is invisible to the user, that is, the user does not need to trigger the UE to fetch the buffered content from the offline download server.

510. The download control network element may further notify the PGW to perform discounted charging on traffic of the content that is downloaded by the offline download server from the content providing server, for example, the traffic is not counted into a user monthly limit, or is discounted at a certain proportion, for example, traffic of 10M is downloaded, but traffic of only 5M is counted into a user monthly limit.

511. After finishing downloading the content, the UE notifies the user that the downloaded content is available.

In this embodiment, only one content download operation needs to be started by a user to perform downloading, thereby improving user experience.

In the content download method described in FIG. 5, network resource congestion of a cell may not be caused, thereby improving a network resource utilization rate. In addition, in the content download method described in FIG. 5, a UE does not need to download content from an offline download server by using a stationary network device (for example, a personal computer) and then synchronize the content to the UE by using a synchronization technology between the stationary network device and the UE, thereby improving user experience.

Figure 6:
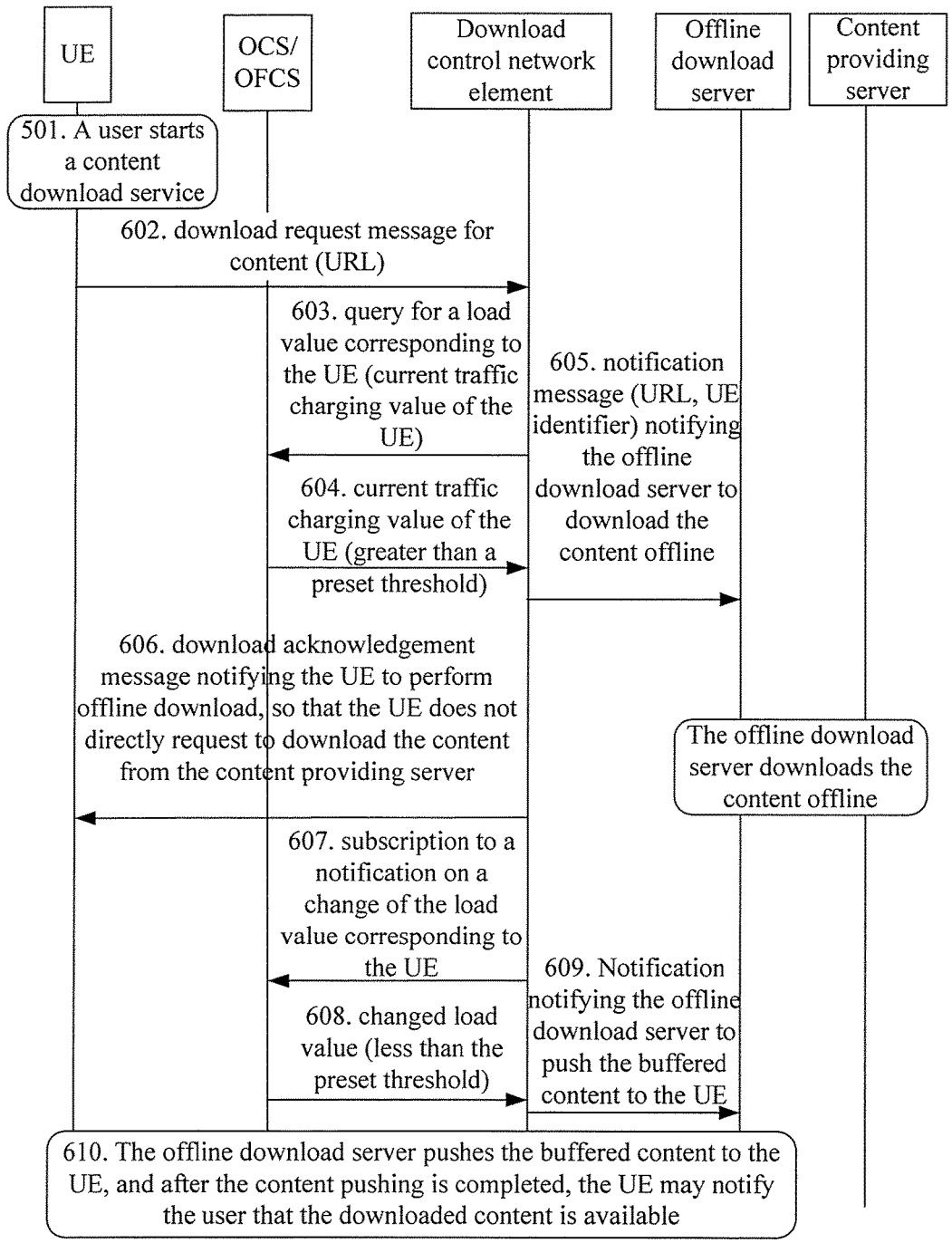
FIG. 6 is a flowchart of a content download method according to a sixth embodiment of the present application.

Referring to FIG. 6, FIG. 6 is a flowchart of a content download method according to a sixth embodiment of the present application. The content download method shown in FIG. 6 is mainly described from perspectives of a UE, a download control network element, and an offline download server. As shown in FIG. 6, the content download method may include the following steps.

601. A user starts a content download service on a UE.

602. The UE sends a download request message for content to a download control network element by invoking an API or sending a message, where the message may include address information (for example, a content URL) of content that the UE needs to download.

603. The download control network element queries a load value corresponding to the UE from an OCS or an OFCS, where the load value corresponding to the UE may be a current traffic charging value of the UE.

The download control network element may send a query request carrying UE identification information to the OCS or OFCS, where the UE identification information may be a phone number or an IP address of the UE, and the like, so as to implement querying the load value corresponding to the UE from the OCS or OFCS.

604. The OCS or OFCS returns the current traffic charging value of the UE to the download control network element, and further the OCS or OFCS may return to the download control network element such information as a monthly quota of the UE and whether the UE is currently in a roaming charging state.

605. The download control network element determines that the current traffic charging value of the UE is greater than a preset threshold (where the preset threshold may be the monthly quota of the UE or 90% of the monthly quota of the UE), and notifies an offline download server to download the content from a content providing server and buffer the content. The notification may include a UE identifier and address information (for example, a URL) of the content that the UE needs to download.

As a possible implementation, when the UE is in a roaming charging mode, the download control network element may also notify the offline download server to download the content from the content providing server and buffer the content. The notification may include a UE identifier and address information (for example, a URL) of the content that the UE needs to download.

After downloading the content from the content providing server in an offline download manner and buffering the content to local, the offline download server may associate the content with the UE identifier.

606. The download control network element returns a download acknowledgement message to the UE, and signals the UE to perform offline download, so that the UE does not directly request to download content from the content providing server.

607. The download control network element may further subscribe to a notification service, to receive from the OCS or OFCS a notification on a change of the load value corresponding to the UE.

608. When the load value corresponding to the UE changes, for example, the load value corresponding to the UE changes from being greater than the preset threshold to being less than the preset threshold, it indicates that the UE returns to a home location and is no longer in a roaming state, or the user resets the monthly quota of the UE (at arrival of a new charging period), or the user raises the monthly quota of the UE, or the like, and the OCS or OFCS reports a changed load value to the download control network element.

609. If the load value corresponding to the UE is less than the preset threshold, the download control network element notifies the offline download server to push the buffered content to the UE.

610. The offline download server responds to the notification of the download control network element, and pushes the buffered content to the UE; and after content pushing is completed, the UE may notify the user that the downloaded content is available.

In the content download method described in FIG. 6, an extra payment by a user can be reduced. In addition, in the content download method described in FIG. 6, a UE does not need to download content from an offline download server by using a stationary network device (for example, a personal computer) and then synchronize the content to the UE by using a synchronization technology between the stationary network device and the UE, thereby improving user experience.

Figure 7:
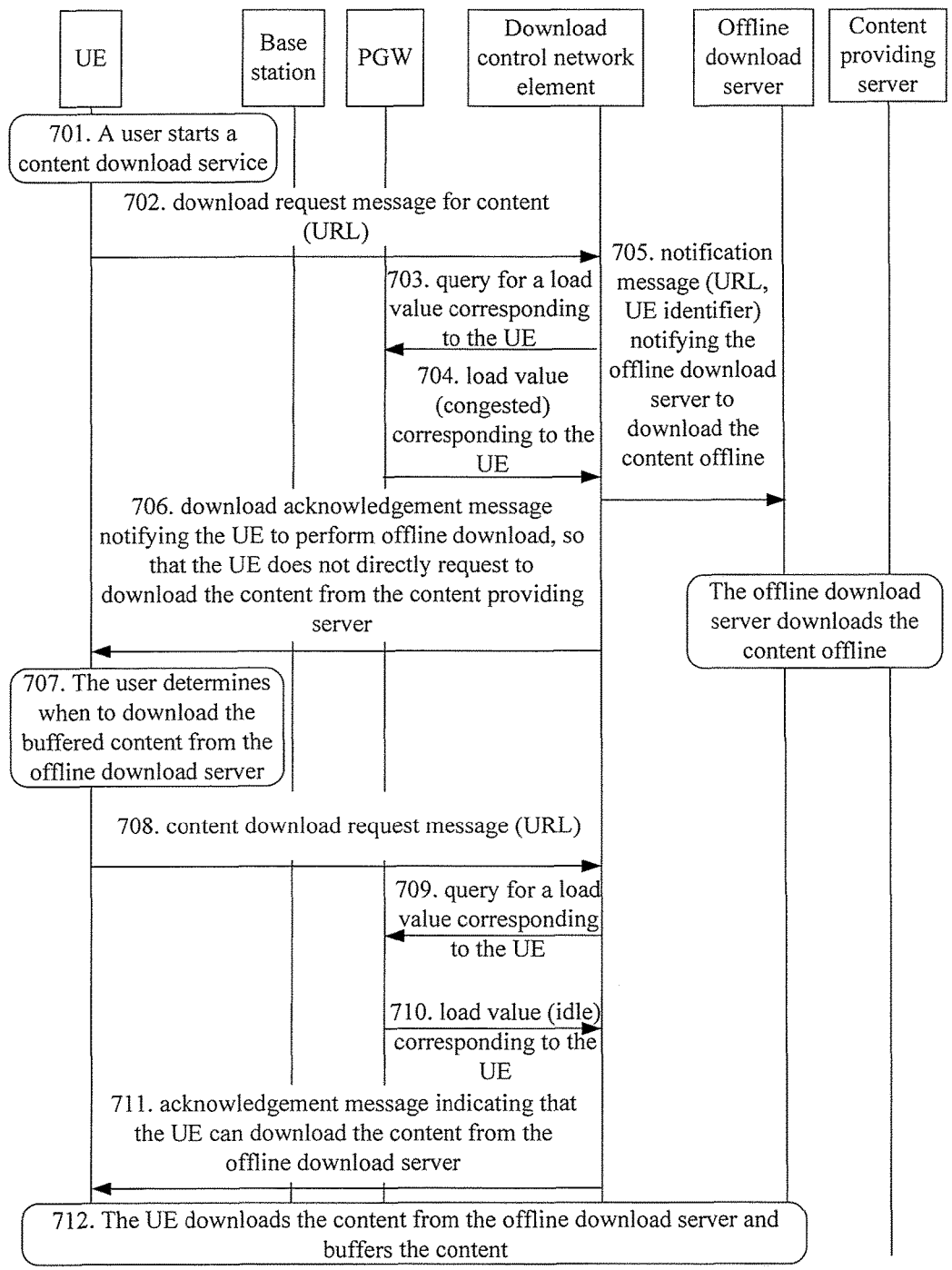
FIG. 7 is a flowchart of a content download method according to a seventh embodiment of the present application.

Referring to FIG. 7, FIG. 7 is a flowchart of a content download method according to a seventh embodiment of the present application. The content download method shown in FIG. 7 is mainly described from perspectives of a UE, a download control network element, and an offline download server. As shown in FIG. 7, the content download method may include the following steps.

Steps 701 to 706 are the same as steps 501 to 505 in FIG. 5, which are not further described in the present application.

707. The user determines when to download the buffered content from the offline download server.

Different from the embodiment described in FIG. 5, in this embodiment, it is the user who determines when to download the buffered content from the offline download server, and the download control network element does not determine when to notify the offline download server to push the buffered content to the UE.

708. The UE sends a download request message for content to the download control network element by invoking an API or sending a message, where the message may include address information (for example, a content URL) of the content that the UE needs to download and is buffered by the offline download server.

709. The download control network element queries a load value corresponding to the UE from the PGW that allocates an IP address to the UE.

710. The PGW returns the load value corresponding to the UE to the download control network element, where the load value corresponding to the UE is less than the preset threshold, that is, network resources of the cell in which the UE is located are idle.

711. The download control network element returns an acknowledgement message to the UE, and indicates that the UE can download the content from the offline download server.

712. The UE downloads the content from the offline download server and buffers the content.

Compared with the embodiment described above, this embodiment can simplify implementation at a download control network element. The download control network element does not need to determine when to notify an offline download server to push buffered content to a UE. However, a user needs to determine when to fetch the buffered content from the offline download server. User experience decreases slightly, but overall implementation of the present application is not affected.

In the content download method described in FIG. 7, network resource congestion of a cell may not be caused, thereby improving a network resource utilization rate. In addition, in the content download method described in FIG. 7, a UE does not need to download content from an offline download server by using a stationary network device (for example, a personal computer) and then synchronize the content to the UE by using a synchronization technology between the stationary network device and the UE, thereby improving user experience.

Figure 8:
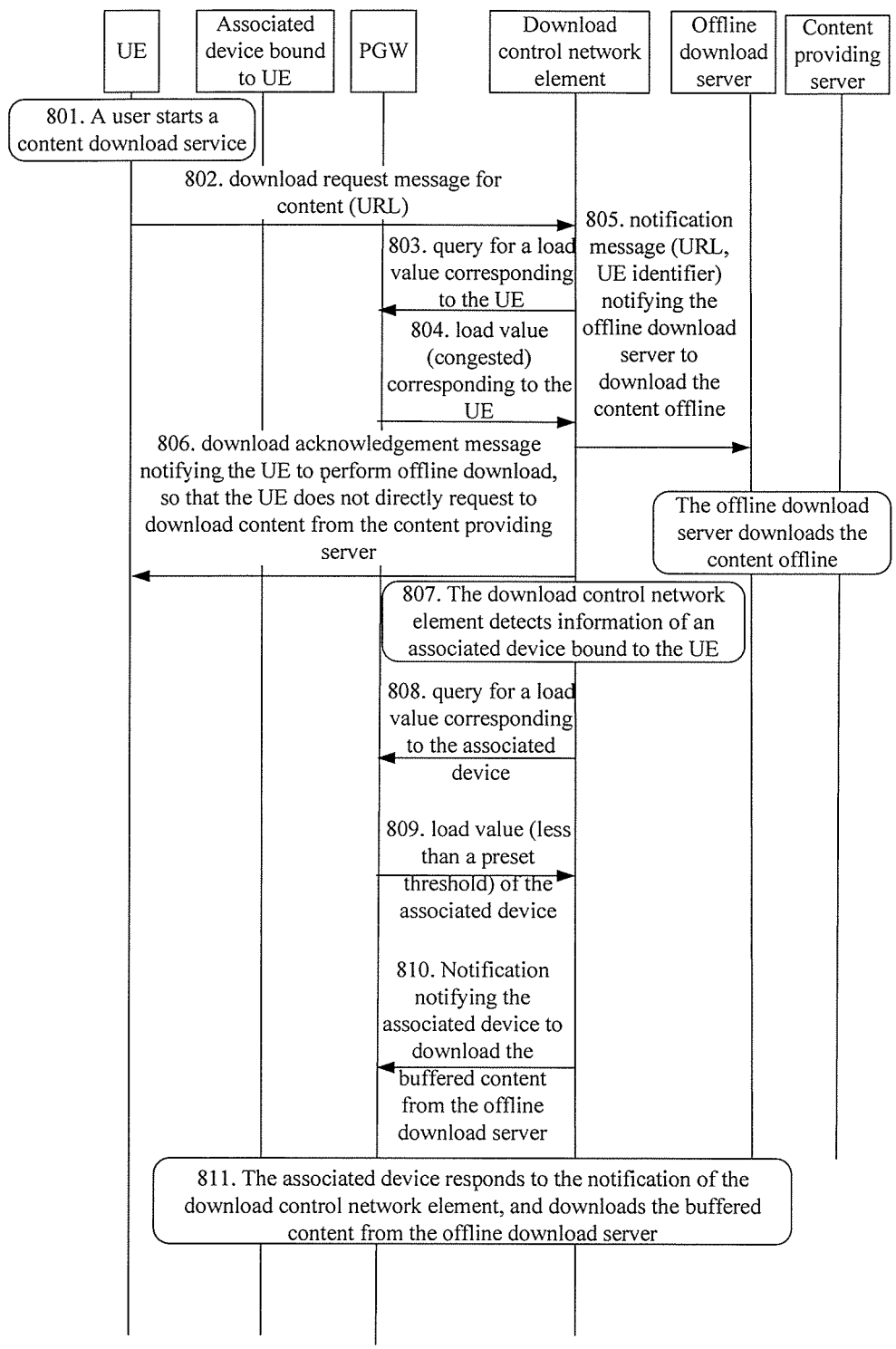
FIG. 8 is a flowchart of a content download method according to an eighth embodiment of the present application.

Referring to FIG. 8, FIG. 8 is a flowchart of a content download method according to an eighth embodiment of the present application. The content download method shown in FIG. 8 is mainly described from perspectives of a UE, a download control network element, and an offline download server. As shown in FIG. 8, the content download method may include the following steps.

Steps 801 to 806 are the same as steps 501 to 505 in FIG. 5, which are not further described in the present application.

807. The download control network element detects information of whether the UE is bound to an associated device, where the UE may be bound to associated devices such as a mobile phone and a personal computer at the same time, and the user may preset associated device information of the associated devices into the download control network element.

808. When the UE is bound to an associated device, the download control network element may query a load value corresponding to the associated device from the PGW.

The download control network element may send to the PGW a query request carrying identification information (for example, a phone number of an associated phone) of the associated device, so as to implement querying the load value corresponding to the associated device from the PGW.

It should be noted that the foregoing step 808 is not mandatory; for some stationary network devices, for example, a fixed-line network terminal such as a personal computer, querying a load value of the stationary network devices is not required.

809. The download control network element receives the load value of the associated device returned by the PGW, where the load value of the associated device is less than the preset threshold.

810. The download control network element notifies the associated device to download the buffered content from the offline download server.

811. The associated device responds to the notification of the download control network element, and downloads the buffered content from the offline download server.

In the content download method described in FIG. 8, network resource congestion of a cell may not be caused, thereby improving a network resource utilization rate. In addition, in the content download method described in FIG. 8, a UE does not need to download content from an offline download server by using a stationary network device (for example, a personal computer) and then synchronize the content to the UE by using a synchronization technology between the stationary network device and the UE, thereby improving user experience.

Figure 9:
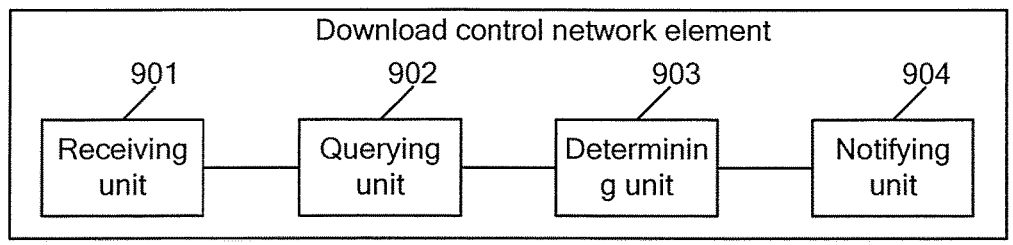
FIG. 9 is a structural diagram of a download control network element according to a ninth embodiment of the present application.

Referring to FIG. 9, FIG. 9 is a structural diagram of a download control network element according to a ninth embodiment of the present application. As shown in FIG. 9, the download control network element may include:

a receiving unit 901, configured to receive a download request message for content sent by a UE;

a querying unit 902, configured to query a state value corresponding to the UE, where the state value corresponding to the UE includes a load value of a cell in which the UE is located currently or a current traffic charging value of the UE;

a determining unit 903, configured to determine whether the state value corresponding to the UE is less than a preset threshold; and a notifying unit 904, configured to, when the determining unit 903 determines that the state value corresponding to the UE is less than the preset threshold, notify the UE to directly download content from a content providing server.

As a possible implementation, the notifying unit 904 is further configured to: when the determining unit 903 determines that the state value corresponding to the UE is greater than or equal to the preset threshold, notify an offline download server to download content from the content providing server and buffer the content.

As a possible implementation, the notifying unit 904 is further configured to notify the offline download server to push the buffered content to the UE, or configured to notify the UE to download the content from the offline download server.

As a possible implementation, the notifying unit 904 is further configured to: when the determining unit 903 determines that the state value corresponding to the UE is less than the preset threshold, notify the offline download server to push the buffered content to the UE, or notify the UE to download the content from the offline download server.

As a possible implementation, the notifying unit 904 is further configured to notify the offline download server to push the buffered content to an associated device bound to the UE, or configured to notify an associated device bound to the UE to download the content from the offline download server.

As a possible implementation, the notifying unit 904 is further configured to notify a PGW to perform discounted charging on traffic of the content that is downloaded by the offline download server from the content providing server.

As a possible implementation, if the state value corresponding to the UE includes a load value of a cell in which the UE is located currently, the querying unit 902 is specifically configured to query the state value corresponding to the UE from the PGW or a base station of the cell in which the UE is located currently.

As a possible implementation, if the state value corresponding to the UE includes a current traffic charging value of the UE, the querying unit 902 is specifically configured to query the state value corresponding to the UE from an OCS or OFCS.

After receiving a download request message for content sent by a UE, the download control network element shown in FIG. 9 firstly queries a state value corresponding to the UE, where the state value corresponding to the UE includes a load value of a cell in which the UE is located currently or a current traffic charging value of the UE; if the load value of the cell in which the UE is located currently is less than a preset threshold, it indicates that there are sufficient network resource of the cell in which the UE is located currently sufficient. In this case, the behavior in which the UE directly downloads content from a content providing server does not cause network resource congestion of the cell, thereby improving a network resource utilization rate; and if the current traffic charging value of the UE is less than a preset threshold, it indicates that the traffic used by the UE is still below the traffic limit specified in the flat monthly package. In this case, the behavior in which the UE directly downloads the content from the content providing server can reduce an extra payment by the user. In addition, the download control network element shown in FIG. 9 eliminates a need for a UE to download the content from an offline download server by using a stationary network device (for example, a personal computer) and then synchronize the content to the UE by using a synchronization technology between the stationary network device and the UE, thereby improving user experience.

Figure 10:
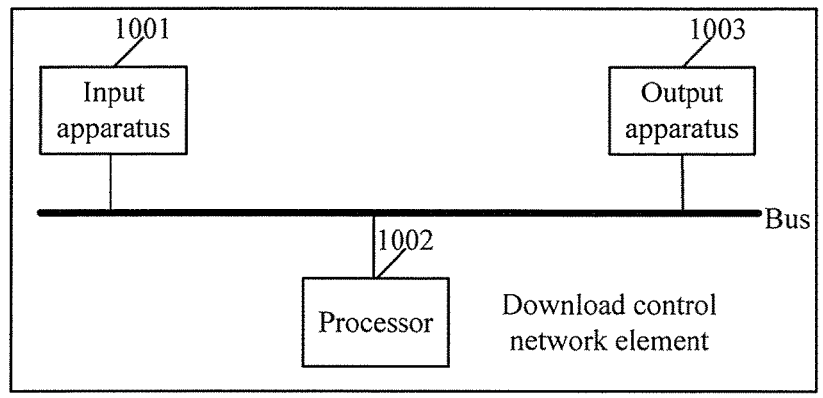
FIG. 10 is a structural diagram of a download control network element according to a tenth embodiment of the present application.

Referring to FIG. 10, FIG. 10 is a structural diagram of a download control network element according to a tenth embodiment of the present application. As shown in FIG. 10, the download control network element may include an input apparatus 1001, an output apparatus 1002, and a processor 1003. In some embodiments of the present application, a connection between the processor 1003 and both the input apparatus 1001 and the output apparatus 1002 may be implemented by using a bus or other manners. In FIG. 10, as an example, the connection is implemented by using a bus.

The processor 1003 executes the following steps:

receiving a download request message for content sent by a user equipment;

querying a state value corresponding to the user equipment, where the state value corresponding to the user equipment includes a load value of a cell in which the user equipment is located currently or a current traffic charging value of the user equipment; and if the state value corresponding to the user equipment is less than a preset threshold, notifying the user equipment to directly download the content from a content providing server.

As a possible implementation, the processor 1003 further executes the following step:

if the state value of the UE is greater than or equal to the preset threshold, notifying an offline download server to download the content from the content providing server and buffer the content.

As a possible implementation, the processor 1003 further executes the following step:

notifying the offline download server to push the buffered content to the UE, or notifying the UE to download the content from the offline download server.

As a possible implementation, the processor 1003 further executes the following step:

before notifying the offline download server to push the buffered content to the UE or notifying the UE to download the content from the offline download server, determining whether the state value corresponding to the UE is less than the preset threshold; and if the state value corresponding to the UE is less than the preset threshold, executing the step of notifying the offline download server to push the buffered content to the UE or notifying the UE to download the content from the offline download server.

As a possible implementation, the processor 1003 further executes the following step:

notifying the offline download server to push the buffered content to an associated device bound to the UE, or notifying an associated device bound to the UE to download the content from the offline download server.

As a possible implementation, the processor 1003 further executes the following step:

notifying a PGW to perform discounted charging on traffic of the content that is downloaded by the offline download server from the content providing server.

As a possible implementation, if the state value corresponding to the UE includes the load value of a cell in which the UE is located currently, when querying the state value corresponding to the UE, the processor 1003 executes the following step:

querying the state value corresponding to the UE from the PGW or a base station of the cell in which the UE is located currently.

As a possible implementation, if the state value corresponding to the UE includes the current traffic charging value of the UE, when querying the state value corresponding to the UE, the processor 1003 executes the following step:

querying the state value corresponding to the UE from an OCS or OFCS.

In the download control network element shown in FIG. 10, network resource congestion of a cell may not be caused, thereby improving a network resource utilization rate. In addition, the download control network element described in FIG. 10 eliminates a need for a user equipment to download content from an offline download server by using a stationary network device (for example, a personal computer) and then synchronize the content to the UE by using a synchronization technology between the stationary network device and the UE, thereby improving user experience.

Figure 11:
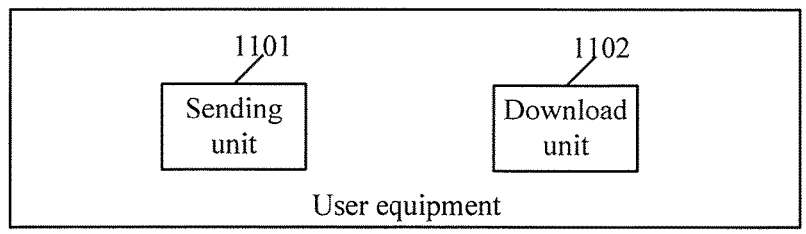
FIG. 11 is a structural diagram of a user equipment according to an eleventh embodiment of the present application.

Referring to FIG. 11, FIG. 11 is a structural diagram of a user equipment according to an eleventh embodiment of the present application. As shown in FIG. 11, the user equipment may include:

a sending unit 1101, configured to send a download request message for content to a download control network element, so that the download control network element is triggered to query a state value corresponding to the UE, and when the state value corresponding to the UE is less than a preset threshold, the download control network element notifies the UE to directly download content from a content providing server, where the state value corresponding to the UE includes a load value of a cell in which the UE is located currently or a current traffic charging value of the UE; and a download unit 1102, configured to respond to the notification of the download control network element, and directly download the content from the content providing server.

As a possible implementation, the download unit 1102 is further configured to receive content pushed by an offline download server; or is configured to respond to the notification of the download control network element, and download the content from the offline download server; where, when the state value of the UE is greater than or equal to the preset threshold, the download control network element notifies the offline download server to download the content from the content providing server and buffer the content, and notifies the offline download server to push the buffered content to the UE, or notifies the UE to download the content from the offline download server.

It can be seen that, by using the user equipment shown in FIG. 11, network resource congestion of a cell may not be caused, thereby improving a network resource utilization rate. In addition, by using the user equipment described in FIG. 11, a user does not need to download content from an offline download server by using a stationary network device (for example, a personal computer) and then synchronize the content to the UE by using a synchronization technology between the stationary network device and the UE, thereby improving user experience.

Figure 12:
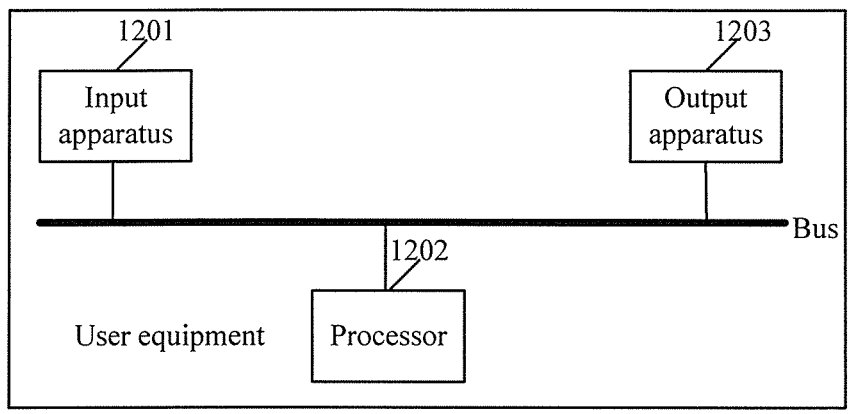
FIG. 12 is a structural diagram of a user equipment according to a twelfth embodiment of the present application.

Referring to FIG. 12, FIG. 12 is a structural diagram of a user equipment according to a twelfth embodiment of the present application. As shown in FIG. 12, the user equipment may include an input apparatus 1201, an output apparatus 1202, and a processor 1203. In some embodiments of the present application, a connection between the processor 1203 and both the input apparatus 1201 and the output apparatus 1202 may be implemented by using a bus or other manners. In FIG. 12, as an example, the connection is implemented by using a bus.

The processor 1203 executes the following steps:

sending a download request message for content to a download control network element, so that the download control network element is triggered to query a state value corresponding to the user equipment, and when the state value corresponding to the user equipment is less than a preset threshold, the download control network element notifies the user equipment to directly download content from a content providing server, where the state value corresponding to the user equipment includes a load value of a cell in which the user equipment is located currently or a current traffic charging value of the user equipment; and responding to the notification of the download control network element, and directly downloading the content from the content providing server.

As a possible implementation, the processor 1203 further executes the following step:

receiving content pushed by an offline download server; or, responding to a notification of the download control network element, and downloading the content from the offline download server; where, when the state value of the user equipment is greater than or equal to the preset threshold, the download control network element notifies the offline download server to download the content from the content providing server and buffer the content, and notifies the offline download server to push the buffered content to the user equipment, or notifies the user equipment to download the content from the offline download server.

It can be seen that, by using the user equipment shown in FIG. 12, network resource congestion of a cell may not be caused, thereby improving a network resource utilization rate. In addition, by using the user equipment described in FIG. 12, a user does not need to download content from an offline download server by using a stationary network device (for example, a personal computer) and then synchronize the content to the UE by using a synchronization technology between the stationary network device and the UE, thereby improving user experience.

Figure 13:
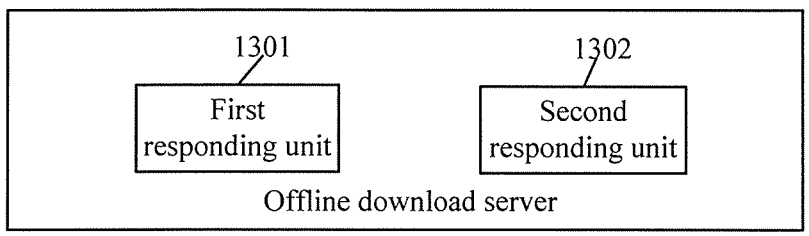
FIG. 13 is a structural diagram of an offline download server according to a thirteenth embodiment of the present application.

Referring to FIG. 13, FIG. 13 is a structural diagram of an offline download server according to a thirteenth embodiment of the present application. As shown in FIG. 13, the offline download server may include:

a first responding unit 1301, configured to respond to a first notification of a download control network element, and download content from a content providing server and buffer the content; and a second responding unit 1302, configured to respond to a second notification of the download control network element, and push the content buffered by the first responding unit 1301 to a user equipment; where the first notification is sent by the download control network element when the download control network element queries, after receiving a download request message for the content sent by the user equipment, a state value corresponding to the user equipment, and the state value corresponding to the user equipment is less than a preset threshold; and the state value corresponding to the user equipment includes a load value of a cell in which the user equipment is located currently or a current traffic charging value of the user equipment.

As a possible implementation, the second responding unit 1302 is further configured to respond to a third notification of the download control network element, and push the content buffered by the first responding unit 1301 to an associated device bound to the user equipment; or, the second responding unit 1302 is further configured to respond to a third notification of the download control network element, and notify an associated device bound to the user equipment to download the content from the offline download server.

It can be seen that, by using the offline download server shown in FIG. 13, network resource congestion of a cell may not be caused, thereby improving a network resource utilization rate. In addition, the offline download server described in FIG. 13 eliminates a need for a user equipment to download content from an offline download server by using a stationary network device (for example, a personal computer) and then synchronize the content to the UE by using a synchronization technology between the stationary network device and the UE, thereby improving user experience.

Figure 14:
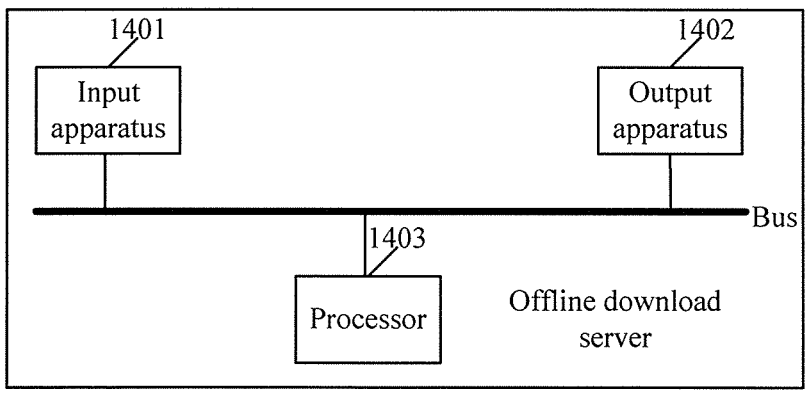
FIG. 14 is a structural diagram of an offline download server according to a fourteenth embodiment of the present application.

Referring to FIG. 14, FIG. 14 is a structural diagram of an offline download server according to a fourteenth embodiment of the present application. As shown in FIG. 14, the offline download server may include an input apparatus 1401, an output apparatus 1402, and a processor 1403. In some embodiments of the present application, a connection between the processor 1403 and both the input apparatus 1404 and the output apparatus 1402 may be implemented by using a bus or other manners. In FIG. 14, as an example, the connection is implemented by using a bus.

The processor 1403 executes the following steps:

responding to a first notification of a download control network element, and downloading content from a content providing server and buffering the content; and responding to a second notification of the download control network element, and pushing the buffered content to a user equipment; where the first notification is sent by the download control network element when the download control network element queries, after receiving a download request message for the content sent by the user equipment, a state value corresponding to the user equipment, and the state value corresponding to the user equipment is less than a preset threshold; and the state value corresponding to the user equipment includes a load value of a cell in which the user equipment is located currently or a current traffic charging value of the user equipment.

As a possible implementation, the processor 1403 further executes the following step:

responding to a third notification of the download control network element, and pushing the buffered content to an associated device bound to the user equipment; or, responding to a third notification of the download control network element, and notifying an associated device bound to the user equipment to download the content from the offline download server.

It can be seen that, by using the offline download server shown in FIG. 14, network resource congestion of a cell may not be caused, thereby improving a network resource utilization rate. In addition, the offline download server described in FIG. 14 eliminates a need for a user equipment to download content from an offline download server by using a stationary network device (for example, a personal computer) and then synchronize the content to the UE by using a synchronization technology between the stationary network device and the UE, thereby improving user experience.

Figure 15:
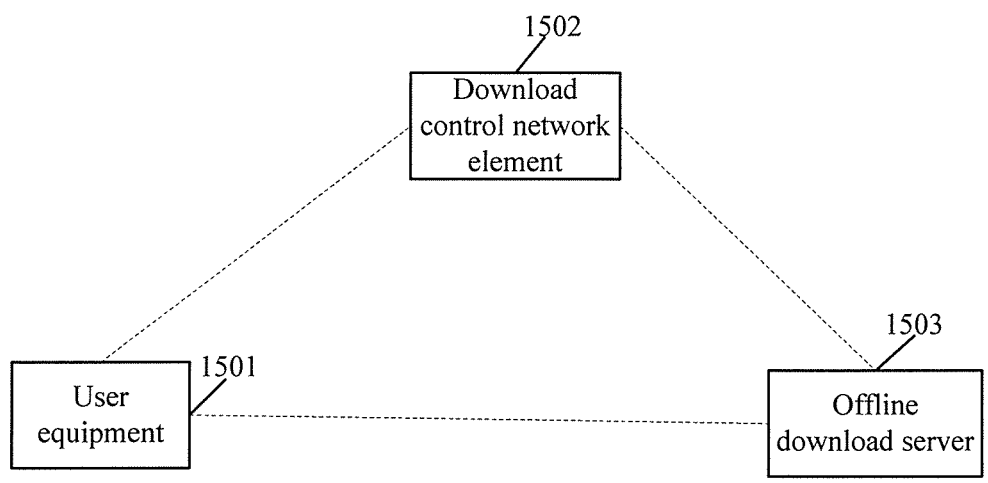
FIG. 15 is a structural diagram of a content download system according to a fifteenth embodiment of the present application.

Referring to FIG. 15, FIG. 15 is a structural diagram of a content download system according to a fifteenth embodiment of the present application. As shown in FIG. 15, the content download system includes at least a user equipment 1501 and a download control network element 1502, where a dashed line between the user equipment 1501 and the download control network element 1502 indicates a wireless connection. A structure of the user equipment 1501 may be the same as a structure of the user equipment shown in FIG. 11 or FIG. 12, and a structure of the download control network element 1502 may be the same as a structure of the download control network element shown in FIG. 9 or FIG. 10, which are not further described in the present application.

The user equipment 1501 is configured to send a download request message for content to the download control network element 1502, respond to a notification of the download control network element 1502, and directly download content from a content providing server.

The download control network element 1502 is configured to receive a download request message for content sent by the user equipment 1501, and query a state value corresponding to the user equipment 1501, where the state value corresponding to the user equipment 1501 includes a load value of a cell in which the user equipment 1501 is located currently or a current traffic charging value of the user equipment 1501; and when the state value corresponding to the user equipment 1501 is less than a preset threshold, notify the user equipment 1501 to directly download the content from the content providing server.

As shown in FIG. 15, the content download system may further include an offline download server 1503, where dashed lines between the offline download server 1503 and both the user equipment 1501 and the download control network element 1502 indicate wireless connections, where:

the offline download server 1503 is configured to respond to a first notification of the download control network element 1502, and download the content from the content providing server and buffer the content.

The download control network element 1502 is further configured to: when the state value of the user equipment 1501 is greater than or equal to the preset threshold, send a first notification to the offline download server 1503, where the first notification is used to notify the offline download server 1503 to download the content from the content providing server and buffer the content.

As a possible implementation, the offline download server 1503 is further configured to respond to a second notification of the download control network element 1502, and push the buffered content to the user equipment 1501.

Correspondingly, the download control network element 1502 is further configured to send a second notification to the offline download server 1503, where the second notification is used to notify the offline download server 1503 to push the buffered content to the user equipment 1501.

Correspondingly, the user equipment 1501 is further configured to receive the content pushed by the offline download server 1503.

As a possible implementation, the offline download server 1503 is further configured to respond to a third notification of the download control network element 1502, and push the buffered content to an associated device bound to the user equipment 1501, or configured to respond to a third notification of the download control network element 1502, and notify an associated device bound to the user equipment 1501 to download the content from the offline download server 1503.

Correspondingly, the download control network element 1502 is further configured to send the third notification to the offline download server 1503, where the third notification is used to notify the offline download server 1503 to push the buffered content to the associated device bound to the user equipment 1501, or configured to notify the associated device bound to the user equipment 1501 to download the content from the offline download server 1503.

The load value of a cell corresponds to a congestion degree of the cell, and the traffic charging value corresponds to a usage of a user monthly quota or a current tariff value.

It can be seen that, in the content download system shown in FIG. 15, network resource congestion of a cell may not be caused, thereby improving a network resource utilization rate. In addition, the content download system described in FIG. 15 eliminates a need for a user equipment to download content from an offline download server by using a stationary network device (for example, a personal computer) and then synchronize the content to the UE by using a synchronization technology between the stationary network device and the UE, thereby improving user experience.

It should be noted that, for brief description, the foregoing method embodiments are represented as a series of actions. However, a person skilled in the art should appreciate that the present application is not limited to the described order of the actions, because according to the present application, some steps may be performed in other orders or simultaneously. It should be further appreciated by a person skilled in the art that the embodiments described in this specification all belong to exemplary embodiments, and the involved actions and modules are not necessarily required by the present application.

In the foregoing embodiments, the description of each embodiment has respective focuses. For a part that is not described in detail in an embodiment, reference may be made to related descriptions in other embodiments.

A person of ordinary skill in the art may understand that all or a part of the steps of the methods in the embodiments may be implemented by a program notifying relevant hardware. The program may be stored in a computer readable storage medium. The storage medium may include a flash memory, a read-only memory (Read-Only Memory, ROM), a random access memory (Random Access Memory, RAM), a magnetic disk, and an optical disk.

The foregoing describes in detail the content download method, related device, and system provided in the embodiments of the present disclosure. In this specification, specific examples are used to describe the principle and implementations of the present disclosure, and the description of the embodiments is only intended to make the method and core idea of the present disclosure more comprehensible. Meanwhile, a person of ordinary skill in the art may, based on the idea of the present disclosure, make modifications with respect to the specific implementations and the application scope. Therefore, the content of this specification shall not be construed as a limitation to the present disclosure.

What is claimed is:

1. A content download method, the method comprising:
receiving a download request message for content sent by a user equipment;
repeatedly query a state value corresponding to the user equipment,
wherein the state value corresponding to the user equipment comprises a load value of a cell in which the user equipment is located currently or a current traffic charging value of the user equipment, and
wherein the load value of the cell is a number of users currently accessing the cell or is a busy/idle degree of the cell;
determining when the state value corresponding to the user equipment becomes less than a preset threshold, and
when the state value corresponding to the user equipment is less than the preset threshold, notifying an offline download server to push the buffered content to the user equipment, or notifying the user equipment to download the content from the offline download server; and
when the state value corresponding to the user equipment is greater than or equal to the preset threshold,
notifying the offline download server to download the content from the content providing server and buffer the content, and
notifying a packet data network gateway to perform discounted charging on traffic of the content that is downloaded by the offline download server from the content providing server.

2. The method according to claim 1, wherein the method further comprises:
notifying the offline download server to push the buffered content to an associated device bound to the user equipment, or notifying an associated device bound to the user equipment to download the content from the offline download server.

3. A non-transitory computer storage medium, wherein:
the computer storage medium stores a program, and when the program is executed, a download control network element is caused to:
receive a download request message for content sent by a user equipment;
repeatedly query a state value corresponding to the user equipment,
wherein the state value corresponding to the user equipment comprises a load value of a cell in which the user equipment is located currently or a current traffic charging value of the user equipment, and
wherein the load value of the cell is a number of users currently accessing the cell or is a busy/idle degree of the cell;
in response to determining that the state value corresponding to the user equipment becomes less than a preset threshold,
notify an offline download server to push the buffered content to the user equipment, or notifying the user equipment to download the content from the offline download server; and
in response to determining that the state value corresponding to the user equipment is greater than or equal to the preset threshold,
notify the offline download server to download the content from the content providing server and buffer the content, and
notify a packet data network gateway to perform discounted charging on traffic of the content that is downloaded by the offline download server from the content providing server.

4. A download control network element, comprising: an input apparatus, an output apparatus, and a processor; wherein
the processor is configured to:
receive a download request message for content sent by a user equipment;
repeatedly query a state value corresponding to the user equipment,
wherein the state value corresponding to the user equipment comprises a load value of a cell in which the user equipment is located currently or a current traffic charging value of the user equipment, and
wherein the load value of the cell is a number of users currently accessing the cell or is a busy/idle degree of the cell;
when the state value corresponding to the user equipment becomes less than a preset threshold,
notify an offline download server to push the buffered content to the user equipment, or notifying the user equipment to download the content from the offline download server; and
when the state value corresponding to the user equipment is greater than or equal to the preset threshold,
notify the offline download server to download the content from the content providing server and buffer the content, and
notify a packet data network gateway to perform discounted charging on traffic of the content that is downloaded by the offline download server from the content providing server.

5. The download control network element according to claim 4, wherein
the processor is further configured to:
notify the offline download server to push the buffered content to an associated device bound to the user equipment, or notify an associated device bound to the user equipment to download the content from the offline download server.

6. A user equipment, comprising: an input apparatus, an output apparatus, and a processor, wherein the processor is configured to:
send a download request message for content to a download control network element, so that the download control network element is triggered to repeatedly query a state value corresponding to the user equipment,
wherein when the state value corresponding to the user equipment becomes less than a preset threshold, either:
the user equipment responds to the notification of the download control network element, and directly downloads the content from the offline download server, or
the download network control element notifies the offline download server to push the buffered content to the user equipment;
wherein the state value corresponding to the user equipment comprises a load value of a cell in which the user equipment is located currently or a current traffic charging value of the user equipment, and
wherein the load value of the cell is a number of users currently accessing the cell or is a busy/idle degree of the cell; and
wherein when the state value corresponding to the user equipment is greater than or equal to the preset threshold, the download control network element notifies the offline download server to download the content from the content providing server and buffer the content,
and notifies a packet data network gateway to perform discounted charging on traffic of the content that is downloaded by the offline download server from the content providing server.

7. An offline download server, comprising: an input apparatus, an output apparatus, and a processor; wherein
the processor is configured to:
respond to a first notification of a download control network element, and
downloading content from a content providing server and buffering the content,
wherein a packet data network gateway is notified to perform discounted charging on traffic of the content that is downloaded from the content providing server; and
respond to a second notification of the download control network element, and pushing the buffered content to a user equipment, wherein
the first notification is sent by the download control network element when the download control network element queries,
after receiving a download request message for the content sent by the user equipment, a state value corresponding to the user equipment, and
the state value corresponding to the user equipment is greater than or equal to a preset threshold; and
the state value corresponding to the user equipment comprises a load value of a cell in which the user equipment is located currently or a current traffic charging value of the user equipment, and
wherein the load value of the cell is a number of users currently accessing the cell or is a busy/idle degree of the cell; and respond to a third notification of the download control network element, and pushing the buffered content to an associated device bound to the user equipment; or respond to the third notification of the download control network element, and notifying an associated device bound to the user equipment to download the content from the offline download server, wherein the third notification is received when the state value corresponding to the user equipment becomes less than the preset threshold.

8. A content download system, comprising at least a user equipment and a download control network element, wherein:

the user equipment is configured to send a download request message for content to the download control network element, respond to a notification of the download control network element, and directly download the content from a content providing server; and the download control network element is configured to:

receive the content download request message sent by the user equipment, and repeatedly query a state value corresponding to the user equipment, wherein the state value corresponding to the user equipment comprises a load value of a cell in which the user equipment is located currently or a current traffic charging value of the user equipment;

when the state value corresponding to the user equipment becomes less than a preset threshold, send a second notification to an offline download server, wherein the second notification is used to notify the offline download server to push the buffered content to the user equipment and wherein the load value of the cell is a number of users currently accessing the cell or is a busy/idle degree of the cell; and when the state value corresponding to the user equipment is greater than or equal to the preset threshold, notify the offline download server, by a first notification, to download the content from the content providing server and buffer the content, and notify a packet data network gateway to perform discounted charging on traffic of the content that is downloaded by the offline download server from the content providing server.

9. The content download system according to claim 8, further comprising the offline download server, wherein:

the offline download server is configured to respond to the first notification of the download control network element, and download the content from the content providing server and buffer the content.

* * * * *